May 26, 1953  F. REINGRUBER ET AL  2,640,130
THERMOSTAT
Filed May 20, 1950
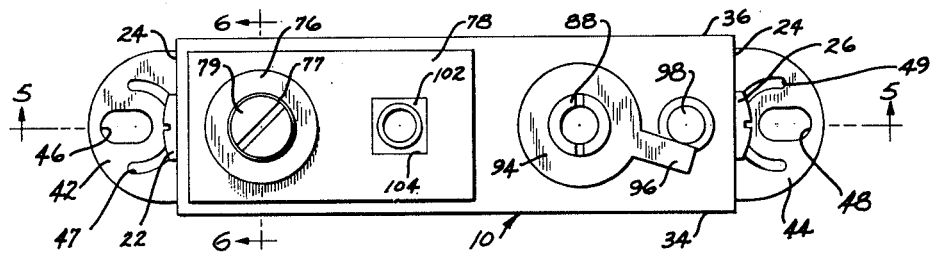
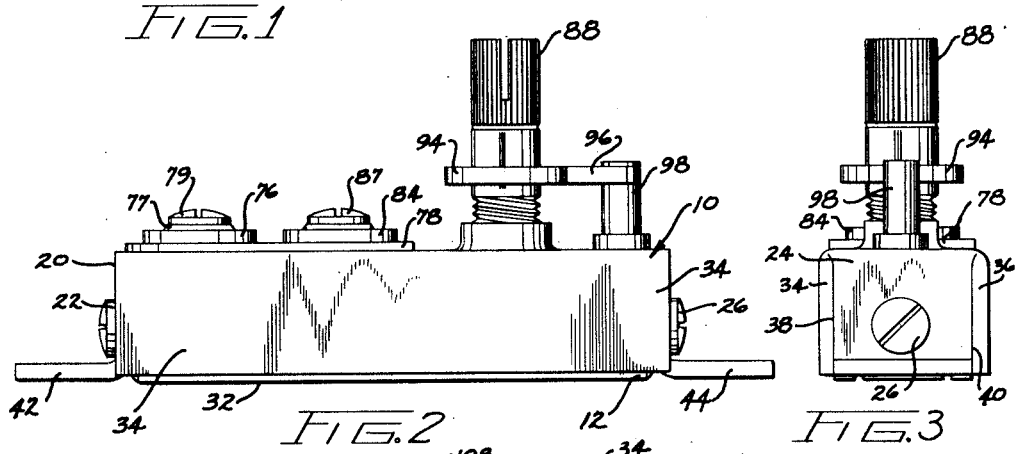
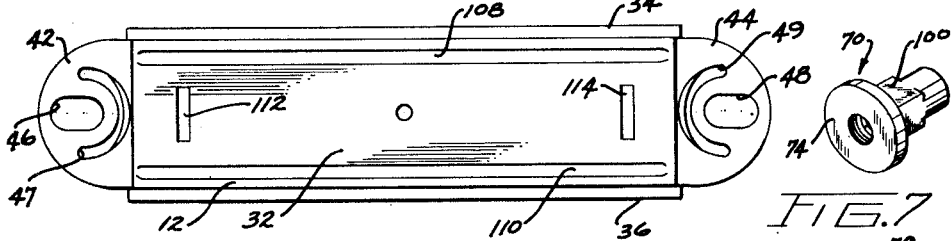
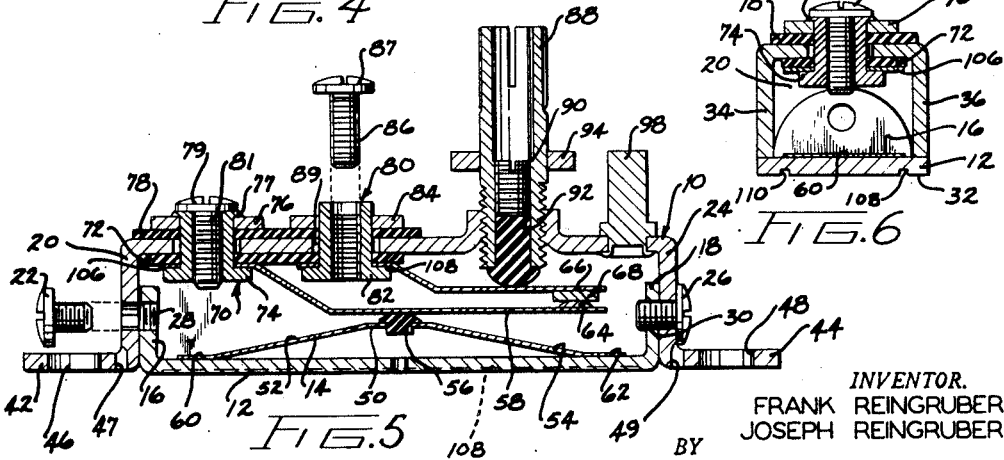
INVENTOR.
FRANK REINGRUBER
JOSEPH REINGRUBER
BY
ATTORNEY Patented May 26, 1953

2,640,130

UNITED STATES PATENT OFFICE 2,640,130

THERMOSTAT

Frank Reingruber, Yonkers, and Joseph Reingruber, New York, N. Y.

Application May 20, 1950, Serial No. 163,266

3 Claims. (Cl. 200—137)

The present invention relates to thermostats and more particularly to that type in which there is employed two metals of dissimilar heat expansion characteristics to actuate a control such as an electric switch.

The present invention may be applied to a thermostat such as that illustrated and claimed in Pat. No. 2,389,686, granted to us on November 27, 1945 or to such as that illustrated in Pat. No. 2,483,670, granted to me, Frank Reingruber, on October 4, 1949.

Our invention contemplates the provision of a thermostat having tapped rivet terminals provided with squared shoulders, which prevent the plate insulators and the switch contact springs from turning and thereby becoming loosened and misaligned.

The present invention still further contemplates the provision of a thermostat, the housing for which is so designed and constructed that strains placed thereon in use are relieved so that the life of the thermostat is relatively increased.

In thermostats of this kind, a bar having a relatively high coefficient of expansion is placed against the surface of a device, the temperature of which is to be controlled. In order to insure the best heat contact between that surface, which of course is relatively flat, and the bar, it is highly desirable that it (the bar) is in a comparatively straight condition.

The present invention therefore still further contemplates a construction so designed and arranged that, when the bar is mounted in the thermostat housing, it (the bar) is spontaneously straightened thereby so that uniform heat contact is obtained between the thermostat and the device, the temperature of which it controls.

The present invention still further contemplates the provision of a base member for the thermostat that is scored on the bottom and surface contact thereof so that it is thereby greatly strengthened.

These, other and further objects and advantages of the present invention and the uses to which it may be put, as well as the devices to which it may be applied, will be clear from the description which follows and the drawing appended thereto, in which Fig. 1 is a top plan view of a thermostat embodying our invention with the upper part thereof partially broken away to show one of the tapped rivet terminals.

Fig. 2 is a side elevation of a thermostat embodying our invention.

Fig. 3 is an end view thereof.

Fig. 4 is a bottom plan view thereof.

Fig. 5 is a section on the line 5—5 of Fig. 1 with one of the fastening screws shown in disassembled position.

Fig. 6 is a section on the line 6—6 of Fig. 1.

Fig. 7 is a perspective view of an internally tapped rivet terminal used with the thermostat embodying our invention.

Referring now to the drawing, we have shown, by way of example, an embodiment of our invention, which, for illustration, is to be applied to a household heating device, such as an electric flatiron, waffle iron, sandwich grill, roaster, coffee maker, etc., and to solder pots, vaporizers, sterilizers, ovens, water heaters, and other household, industrial and laboratory devices, having a flat surface or body, the temperature of which is to be automatically controlled by the thermostat which is mounted on it, as a separate unit, in good heat transfer contact therewith.

The elements of the temperature responsive mechanism of our thermostat and the electrical terminals thereof are mounted on the housing 10, which comprises the open bottom box-like structure or cover member.

The temperature responsive mechanism comprises the base member 12, which is formed from a metal having a relatively high coefficient of expansion, such as, brass or aluminum and the spring member 14, which is formed from a metal having a lower coefficient of expansion, such as, nickel alloy spring steel.

The member 14 preferably is formed from thin plate steel and of characteristics such that its resiliency is retained at the highest temperatures to which it may be subjected in the normal operation of the device with which the thermostat is associated.

The base member 12, at each end, is formed with the upturned flanges or fingers 16 and 18 which are turned or bent slightly inwardly toward the center of the flat bar portion 12 of the base member, for the purposes which we shall explain hereinafter.

In the illustration of Fig. 5, the finger 16 is shown bent or turned inwardly before this finger has been secured to the end wall 20 of the housing by the screw 22, which latter is illustrated in that figure in an exploded view.

In the same figure, namely Fig. 5, the finger 18 is illustrated as secured to the other end wall 24 of the housing 10 by the screw 26. When the finger is thus secured to the end wall, it is pulled against the end wall and thus straightened and held there in this position.

It will now be recognized that by mounting the base member 12 on the housing 10 in the manner described and drawing both fingers 16 and 18 outwardly against the end walls 20 and 24 upon tightening the screws 22 and 26, which screws are engaged in the internally tapped openings 28 and 30 in the fingers and end walls, the flat portion 12 of the base member will be straightened to insure good surface contact with the body of the device, the temperature of which is controlled by the thermostat.

Thus, the base plate 32 (see Fig. 4) formed by the undersurface of the base member 12, is in full area conduction contact with the heated surface of the device, the temperature of which is controlled. This results in a minimum temperature "over-shoot," a smaller cycling differential and faster response to temperature changes.

The end walls 20 and 24 are spaced or separated from the side walls 34 and 36 of the housing 10 by means of the slots or cutaways 38 and 40 (see Fig. 3). The split wall or split ear thus formed relieves the housing 10 from any strain that may be imposed thereon by reason of its contraction and expansion under the influence of changes of heat to which it is subjected in use. It will be understood of course, that the metallic housing 10 is much more rigid than the material from which the base member 12 is formed, so that the member will be straightened as previously described even though the end walls 20 and 24 are split or separated from the side walls 34 and 36.

In order to secure our thermostat to the surface of the device, the temperature of which is to be controlled, we form on each end wall 20 and 24, the ears 42 and 44 in each of which are provided the openings 46 and 48, which receive the fastening screws, which need not be shown. This construction also serves to operatively hold the thermostat in contact with the surface of the device but leaves the base member 12 free to expand under the influence of heat.

The openings 46 and 48 are somewhat elongated to provide longitudinal mounting adjustment in position on the device of the thermostat. In order to relieve strain when fastening the thermostat to the device to be controlled, the ears 42 and 44 may be cut away at the curvilinear slots 47 and 49.

It will also be understood that the thermostat housing 10 may be designed for side mounting on the device, the temperature of which is to be controlled as shown in Pat. No. 2,483,670. The housing may also be mounted on the device by means of a metallic strap, which need not be illustrated, located transversely across the thermostat.

The spring like member 14 is preferably provided at the center thereof with the platform 50 from which the inclined legs 52 and 54 depend. On the platform 50 we mount the insulating button 56, on which the contact spring element rides and follows the member 14 down as it spreads away from the center by the expansion of the base member 14.

The inclined legs 52 and 54 at their ends are bent to form the toes or stubs 60 and 62, which are secured to the base member 12.

The spring like member 14 is upwardly tensioned and the spring like element 58 downwardly tensioned against the insulating button 56.

The switch of our thermostat comprises the downwardly tensioned spring like element 58 at one end of which is positioned the contact point or button 64 and the upwardly tensioned spring like element 66 at one end of which is positioned the second switch contact or button 68. These contact points 64 and 68 are preferably made from silver which is welded to the stainless steel springs 58 and 66.

When the switch is closed the contacts 64 and 68 are pushed against each other and when the switch is opened the contact 64 is pulled away from the contact 68.

The other end of the spring element 58 is secured to the inwardly tapped rivet terminal 70 (see Fig. 5) between the insulating plate 72 and the rivet head 74. A second insulating plate 78 is held in position by means of the washer 76 and the rivet peen 77. A lead wire (not shown) from a source of supply is secured to the rivet terminal 70 between the head 79 of the screw 81 and the rivet peen 77.

The upwardly tensioned spring element 66 is secured at its other end to the second internally tapped rivet terminal 80 between the rivet head 82 and the first insulating plate 72, which may be made from mica.

The second insulating plate 78 is held in position by means of the second washer 84 and a peen that will be formed by the upper portion of the rivet terminal 80. The rivet terminal 80 is not illustrated in Fig. 5 as being peened and the screw 86 is illustrated in an exploded view. The other lead wire (not shown) from the source of supply is held on the rivet terminal 80 by means of the head 87 by the screw 86.

The spaces 89 (see Fig. 5) between the rivet terminals 70 and 80 and the housing 10 may contain an insulating spacer washer, although this is not shown. It serves a triple purpose. First, it provides a better dielectric insulation; second, it provides centering of terminal rivets; and third, it forms a solid riveting assembly.

In operation the contact points 64 and 68 are normally positioned against each other and the thermostat switch closed, as illustrated in Fig. 5. As the temperature rises the bar 12 expands pulling the spring like member 14 down, which movement is followed by the downwardly tensioned spring element 58.

Since the other spring element 66 is upwardly tensioned this movement separates the switch contacts 64 and 68 to open the switch and shut off the current to the device.

As the device cools, the bar member 12 contracts pushing the platform 50 and button 56 upward against the spring element 58 to bring the switch contact points together to close the switch and the circuit to the device.

Means are provided for adjusting the operative limits of the thermostat by limiting the separation of the contact points 64 and 68 which comprises the preferably knurled adjusting shaft 88 which is threadably mounted in the top wall of the housing 10.

A calibrating set screw 90 is threadably mounted in the tapped interior of the hollow adjusting shaft 88 and engages the preferably ceramic abutting member 92 against which the spring like element 66 is upwardly tensioned.

A stop collar 94 is mounted on the adjusting shaft 88 and is provided with the lug 96 which may be held against the stop member 98 extending upwardly on the top wall of the housing 10. Thus the separation between the contact points may be adjusted by selectively positioning the calibrating set screw 90 in the adjusting shaft 88.

In order to assure positive and permanent alignment of the spring elements 58 and 66 and the insulating plates 72 and 78, we form the squared shoulders 100 and 102 on the rivet terminals 70 and 80. Only one 70 of the similar rivet terminals 70 and 80 is illustrated in perspective in Fig. 7.

The mica insulating plates 72 and 78 are provided with the squared openings 104 (see Fig. 1), which fit onto the squared shoulders 100 and 102 of the rivet terminals 70 and 80. The substantially horizontal portions 106 and 108 of the spring elements 58 and 66 are provided with similar squared openings.

Thus the mica insulating plates 72 and 78 and the spring elements 58 and 66 are immovably held on the rivet terminals 70 and 80 insuring that they will always be positively and permanently in alignment whereby the contact points 64 and 68 will always meet when the spring 58 is moved upwardly by the member 14.

In order to strengthen the base member 12, we preferably provide on the undersurface thereof the parallel longitudinal scoring 108 and 110 and the transverse scoring 112 and 114.

While we have illustrated a specific embodiment of our invention, we do not intend to be limited to the specific details of construction shown since modifications thereof within the spirit and scope of the invention will occur to those skilled in the art.

Hence we intend to claim our invention as broadly as the prior art and scope of the appended claims will permit.

We claim:

1. In a thermostat, a temperature responsive mechanism, a switch mechanism controlled by the temperature responsive mechanism, said switch mechanism comprising a first spring element tensioned against the temperature responsive mechanism and a second spring element tensioned away from said first spring element, said spring elements being longitudinally separated from each other and carrying registering contacts, a first rivet terminal, said first rivet terminal having a squared shoulder, said first spring element having a squared opening therein, said squared shoulder inserted in said squared opening to hold said first spring element in position in the thermostat, a second rivet terminal, said second rivet terminal having a squared shoulder and said second spring element having a second squared opening therein, said second squared shoulder inserted in said second squared opening to hold said second spring element in position in the thermostat, an insulating plate having longitudinally separated, squared openings receiving the squared shoulders of said rivets and thereby holding said spring elements longitudinally separated with the contacts carried thereby in registration, said rivets being held non-rotatably in said insulating plate through engagement of the squared shoulders in the squared openings in said plate and said non-rotatably held rivets being internally tapped, and terminal screws engaged in said internally tapped rivets and rotatable to secure terminal wires without turning the rivets or the spring elements carrying the contacts.

2. In a thermostat, a housing for the operative elements thereof, comprising a top wall, side walls, and end walls extending from the top wall, temperature responsive elements secured in the housing and having a base member for heat transfer contact with a device to be controlled by the thermostat, said end walls separated from the side walls and means for securing the thermostat to the device to be controlled thereby, said means including ears projecting angularly from said end walls and each having an elongated opening for receiving a fastening screw and a curvilinear slot between the end wall and the elongated slot, said elongated slot extending between the ends of the curvilinear slot to define a portion within the outline of the curvilinear slot which may be deformed by pressure of the head of a fastening screw extending through the elongated slot.

3. A thermostat comprising a housing having substantially vertical end walls and open at the bottom between said end walls, temperature responsive elements in the housing and including a base member closing the bottom of the housing and having upstanding fingers at the ends of the same inclined inwardly toward each other and positioned at the inner sides of the end walls of the housing, screw means for straightening said inwardly inclined fingers against the inner faces of said end walls and said base plate having integral, longitudinal reinforcement strengthening the same in a straightened condition and holding it against deformation from the straightening effort applied on the inwardly inclined fingers of the base plate.

FRANK REINGRUBER.
JOSEPH REINGRUBER.

References Cited in the file of this patent

UNITED STATES PATENTS

| Number | Name | Date |
|---|---|---|
| 2,312,408 | Hansen | Mar. 2, 1943 |
| 2,380,782 | Owens | July 31, 1945 |
| 2,420,184 | Mekelburg | May 6, 1947 |
| 2,483,670 | Reingruber | Oct. 4, 1949 |
| 2,496,917 | Poitras | Feb. 7, 1950 |
| 2,516,501 | Altman et al. | July 25, 1950 |
| 2,574,134 | Vigren et al. | Nov. 6, 1951 |